United States Patent [19]

Bigo

[11] Patent Number: 5,074,575
[45] Date of Patent: Dec. 24, 1991

[54] FOLDING CHILD'S PUSH CHAIR

[75] Inventor: Jean Bigo, Cholet, France

[73] Assignee: Ampafrance S.A., Boulogne-Billancourt, France

[21] Appl. No.: 532,739

[22] Filed: Jun. 4, 1990

[30] Foreign Application Priority Data

Jun. 2, 1989 [FR] France .................... 89 07335

[51] Int. Cl.⁵ .................................. B62B 7/06
[52] U.S. Cl. ............................ 280/642; 280/647
[58] Field of Search ........... 280/642, 644, 647, 649, 280/650, 657, 658; 297/29, 31, 46, DIG. 4

[56] References Cited

FOREIGN PATENT DOCUMENTS 0271422  6/1988  European Pat. Off. .
2607770  6/1988  France .
2162801  2/1986  United Kingdom .
2204282  11/1988  United Kingdom .

Primary Examiner—Andres Kashnikow
Assistant Examiner—Richard Camby
Attorney, Agent, or Firm—Oblon, Spivak, McClelland, Maier & Neustadt

[57] ABSTRACT

Folding child's push chair which includes two lateral chassis units interconnected by at least one transverse bracing member and which can be deformed for the folding-up and unfolding of the push chair, each lateral chassis unit including a push bar integral with a handlebar, a front underframe and a rear underframe, the push bar being able to slide parallel to the front underframe via a sliding piece integral with the upper end of the front underframe, wherein two sleeves, each traversed freely by the push bar and the front underframe, are each integral with a support piece extending downwards and having a bearing for a hinge pin of the rear underframe, the rear underframe having an extension beyond the hinge pin, and wherein a connecting rod is articulated between the end of the extension of the rear underframe and a point next to the lower end of the push bar.

10 Claims, 2 Drawing Sheets

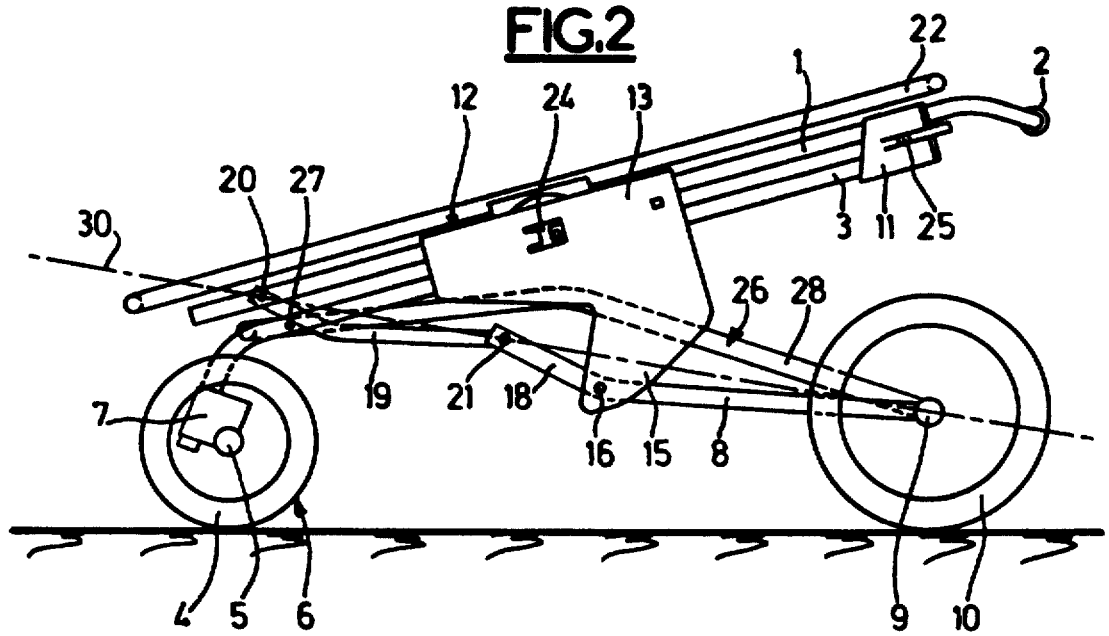
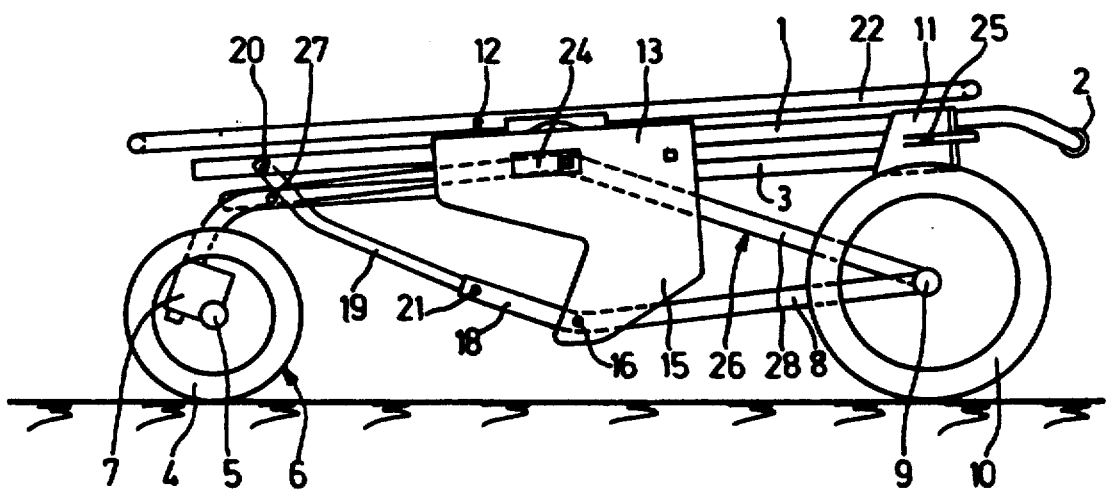

FOLDING CHILD'S PUSH CHAIR

BACKGROUND OF THE INVENTION

1. Field of the Invention

The subject of the invention is a child's push chair of the type comprising two lateral chassis units interconnected by at least one transverse bracing member, the two lateral chassis units being deformable so as to enable the push chair to be folded up and unfolded.

2. Discussion of the Background

Push chairs of this type are already known in which the folding is controlled by a pushing action on a portion of the chassis integral with the handlebar and consequently capable of forming a push bar. During the movements of folding up and unfolding of the push chair, the push bar may slide parallel to the front underframe of the push chair via a sliding piece fixed close to the upper end of the front underframe. The link between the various elements forming each lateral chassis unit so as to ensure folding up and unfolding of the whole push chair, usually consists of a connecting rod articulated between the bottom end of the sliding push bar and a mid or lower zone of the rear underframe of the push chair. In this manner, a pressing action on the handlebar or push bar, after any immobilizing or locking members have been freed, causes the rear underframe to pivot about a hinge pin which may, for example, be integral with the abovementioned sliding piece, the two lateral chassis units being situated, after folding, in a compact position, all the wheels of the push chair having been brought together. In an alternative, it is also possible to reverse the positions of the respective hinge pins of the connecting rod and of the rear underframe so as to obtain, conversely, a separation of the wheels of the push chair from each other in the folded-up position of the push chair, but in the general plane of the whole folded-up chassis.

It will be possible to refer, by way of example, to a folding push chair of this type as described in French Patent Application 84 09 814 (AMPAFRANCE).

SUMMARY OF THE INVENTION

The object of the present invention is to provide a folding child's push chair which enables the structural rigidity of the push chair to be increased, in particular in terms of the link between the wheels and the chassis while at the same time enabling the two lateral chassis units to be folded up compactly and easily.

The subject of the present invention is also a chassis structure which enables the compactness of the folded-up push chair to be increased.

Lastly, the object of the invention is also to design a protective casing arrangement encasing, in the unfolded position, all the movable articulated elements enabling the push chair to be folded up.

The folding child's push chair according to the invention comprises two lateral chassis units interconnected by at least one transverse bracing member. The two lateral chassis units are deformable in order to enable the push chair to be folded up and unfolded. Each lateral chassis unit comprises a push bar integral with a transverse handlebar, a front underframe and a rear underframe. The push bar can slide parallel to the front underframe via a sliding piece integral with the upper end of the front underframe. According to the invention, the push bar furthermore comprises two sleeves, each traversed freely by the push bar and the front underframe and each integral with a support piece extending downwards and having a bearing for a hinge pin of the rear underframe. The rear underframe comprises an extension extending beyond the abovementioned hinge pin. A connecting rod is articulated between the end of the extension of the rear underframe and a point of the push bar next to its lower end.

As a result of such an arrangement, folding-up of the push chair is effected, after unlocking any immobilizing member, by a simple direct pushing action on the push bar or via the handlebar with which it is integral. This action causes the push bar to slide parallel to the front underframe and, at the same time, traction on the connecting rod occurs which gives rise to a torque relative to the hinge pin of the rear underframe, causing the latter to pivot about its hinge pin integral with the support piece. In this movement, the two sleeves are displaced by sliding on the push bar and on the front underframe, these being driven in their movement by the hinge pin of the rear underframe. The wheels of the push chair do not participate in the movement and remain stationary. In the completely folded-up position of the push chair, the two lateral chassis units are completely folded up substantially in the plane of the axles of the wheels of the push chair. The push bar which, in the unfolded position of the push chair, projects upwards in order to enable the handlebar of the push chair to be gripped at an appropriate height, is situated, in the completely folded-up position of the push chair, substantially between the respective axles of the front and rear wheels of the push chair.

It can be understood that in this manner an extremely compact folded-up position of the push chair may be obtained. Moreover, given that the wheels do not participate in the folding-up movement, contrary to what was the case beforehand and in particular in the known abovementioned push chair, it is possible to strengthen the lower part of the chassis of the push chair without difficulty, thus increasing the rigidity of the whole.

The orientation and the length of the extension of the rear underframe above its hinge pin on the support piece are preferably such that, in the folded-up position of the push chair, the point of articulation of the connecting rod on the push bar is close to a position aligned with the point of articulation of the connecting rod on the said extension of the rear underframe and with the lower pivoting point of the rear underframe. In this manner, the minimum size for the push chair is obtained in the folded-up position.

To this end, it may be envizaged, in an advantageous embodiment, for the extension of the rear underframe to be produced in a backwardly angled shape so as to further lengthen the connecting rod.

In other embodiments, however, it will be preferred to tolerate the push bar projecting slightly, in the completely folded-up position of the push chair, the three above points then not being aligned exactly in the completely folded-up position of the push chair.

The support piece preferably forms part of a protective casing which encloses the sleeve and completely conceals the connecting rod and the extension of the rear underframe in the unfolded position of the push chair. With a structure of this type, all the hinge and link elements of each lateral chassis unit are entirely hidden inside the protective casing.

Each protective casing may furthermore advantageously receive a support and position-adjusting means for a carry-cot for receiving the child, which carry-cot is mounted between the two lateral chassis units. The protective casing may then also have locking-in-position or braking members which can act on the orientation of the carry-cot for receiving the child and also on the sliding of the push bar and of the front underframe inside the sleeve.

In a first embodiment, the lower ends of the rear underframes may be articulated directly about a rear transverse axle, also carrying two rear wheels for the push chair.

The lower ends of the front underframes may be articulated about a front transverse axle, also carrying two front wheels for the push chair.

In another embodiment, the lower ends of each front underframe may receive an independent wheel unit capable of pivoting about a vertical axis in order to ensure the changes in direction of the push chair. Each wheel unit may comprise one or two wheels. The wheel units may furthermore be locked in a fixed position in a well-known manner.

In another embodiment, the push chair may also comprise a lower substantially horizontal base articulated on the lower ends of the rear underframes and front underframes. This rigid base may consist, for example, of a tubular frame which ensures great rigidity for the lower portion of the push chair. This base may, for example, support a basket for transporting packages or other objects. The presence of this lower base, optionally provided with its transport basket, in no way hinders the folding-up and unfolding of the push chair since the lower part, and in particular the axles of the wheels, do not participate in the folding-up and unfolding movement.

BRIEF DESCRIPTION OF THE DRAWINGS

The invention will be better understood from studying the detailed description made by way of non-limiting example of an embodiment of the invention, illustrated by the attached drawings, in which:

FIG. 2 is a view of the same simplified push chair shown in the course of being folded into a position which corresponds to the minimum longitudinal size of the chassis elements; and completely folded-up position.

FIG. 3 is a view of the same push chair in the completely folded-up position.

DESCRIPTION OF THE PREFERRED EMBODIMENTS

Figure 1:
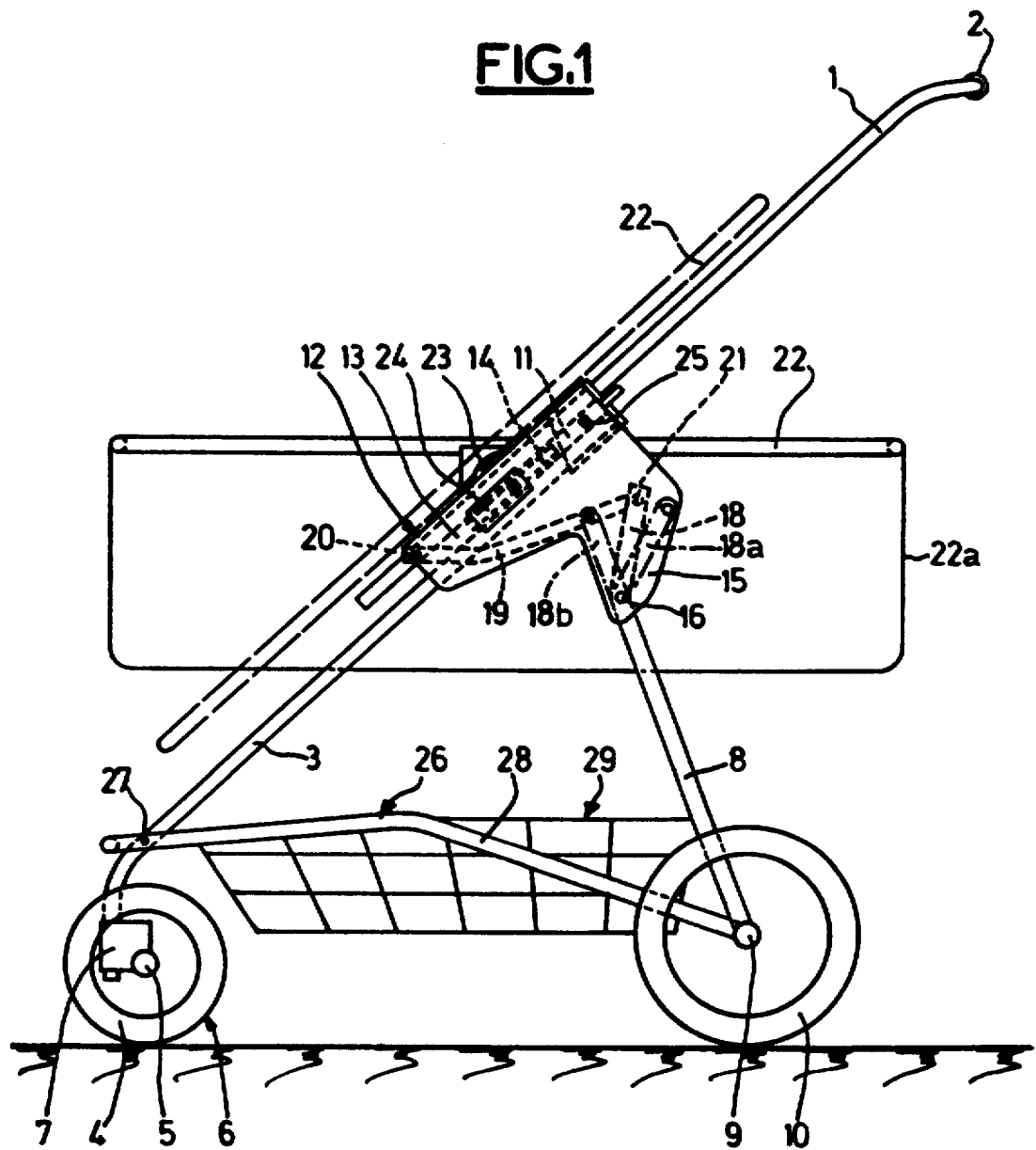
FIG. 1 shows schematically a folding push chair according to the invention in side view and in the completely unfolded position.

Referring to the attached figures, the folding push chair according to the invention comprises, on each side of its chassis, a push bar 1 integral with a transverse handlebar 2 which could optionally be replaced by two independent handles. A front underframe 3 is arranged parallel to the push bar 1 and carries, at its end folded into the vertical 4, an individual axle 5 for a wheel unit 6 having two small wheels, which unit is mounted via a suspension 7 having, furthermore, locking-in-direction means which have not been shown in the figure.

The rear underframe 8 carries, at its lower end, a transverse axle 9 common to two rear wheels 10, only one of which can be seen in FIG. 1. It will, of course, be understood that in another embodiment the single transverse axle 9 can be replaced by two independent axles, each carrying one of the rear wheels 10.

Given that the push chair is shown in FIG. 1 in side view, it will be understood that the complete chassis of the push chair in reality consists of two identical lateral units, each having a push bar 1, a front underframe 3, a rear underframe 8 as well as the various members linking these elements together and which will now be described in detail.

A sliding piece 11, clearly visible in FIG. 2, is fixed integrally at the upper end of the front underframe 3. The sliding piece 11 may consist of a plastic piece fixed to the end of the front underframe 3 and have a passage for the push bar 1 to slide freely. During folding-up and unfolding movements of the push chair, the sliding piece 11 therefore participates in the guiding of the sliding of the push bar 1 relative to the front underframe 3.

A protective casing, referenced as a whole by 12, comprises a guide sleeve 13 inside which both the push bar 1 and the front underframe 3 may slide freely. In order to obtain such a result, a solid piece may be provided having appropriate passages for the push bar 1 and the front underframe 3. As illustrated schematically in FIG. 1, a hollow piece may also be provided having one or more internal slide bearings 14.

The protective casing 12 also comprises a downward extension forming a support piece 15, the lower end of which has a bearing for a hinge pin 16 of the rear underframe 8. Although the assembly of the protective casing 12 comprises two walls separated from each other so as to be able to encase the various chassis members, such as the push bar 1, the front underframe 3 and the rear underframe 8, for example made of a tubular shape, a bore need only be pierced in these two lateral walls to enable the hinge pin 16 to pass through and be supported. Although the support piece 15 is shown here as forming an integral part of the casing 12, it may, as an alternative, be produced differently, for example in the form of an independent piece fixed to the sleeve 13.

The rear underframe 8 has an extension 18 situated beyond and above the hinge pin 16 in the unfolded position of the push chair illustrated in FIG. 1. In the example illustrated in FIG. 1, the extension 18 is angled backwardly, forming an angle of approximately 30° with the main part of the rear underframe 8. A connecting rod 19, slightly angled as can be seen in FIG. 1, is fixed by a first hinge pin 20 close to the lower end of the push bar 1 and by a second hinge pin 21 to the upper end of the extension 18. Both the rod 19 and the extension 18 are concealed inside the protective casing 12 in the completely unfolded position of the push chair illustrated in FIG. 1.

It will be understood that the push chair has on each side a protective casing 12 and a connecting rod 19 which complete the lateral chassis unit already comprising the push bar 1, the front underframe 3 and the rear underframe 8. A support 22 for a hammock 22a or a carry-cot for receiving a child is arranged between each of these lateral chassis units thus formed. The support 22 may consist, as illustrated in FIG. 1, of a generally rectangular frame. The support 22 is fixed laterally by two adjusting cam wheels 23 mounted on the inner wall of each of the protective casings 12 so as to allow a pivoting movement of the support 22 between the position illustrated in solid lines in FIG. 1, or lying-down position, and the position illustrated in broken lines, or sitting position.

Locking of the support 22 in position is ensured by two locking members, one of which, referenced 24, can be seen in FIG. 1. In order to ensure the orientation and pivoting of the support 22, the locking members 24 then need only be unlocked, which may advantageously simultaneously cause the sleeve 13 to be made free to slide relative to the push bar 1 and to the front underframe 3. Immobilizing of the push chair in the completely unfolded position is ensured by an immobilizing member 25 integral with the sliding piece 11 and interacting with the protective casing 12.

The push chair is completed, in the example illustrated in FIG. 1, by a lower base 26 taking the form of a substantially rectangular and horizontal frame, the rear side of which forms the rear transverse axle 9. The front underframes 3 are articulated by a pin 27 close to the front ends of the lateral bars 28 which, in the example illustrated, are slightly angled so as to facilitate mounting of a transport basket 29 inside the frame 26. It should be noted that the existence of the lower base 26 is not essential although it does improve the rigidity of the chassis of the push chair as a whole.

The operation of folding up the push chair from the completely unfolded position illustrated in FIG. 1 and into the completely folded-up position illustrated in FIG. 3 will now be explained using FIGS. 1 to 3. In order to simplify the figures, neither the carry-cot 22a nor the basket 29 has been shown in FIGS. 2 and 3.

In order to fold up the push chair from the position illustrated in FIG. 1, firstly the two locking members 24 situated on the two lateral protective casings 12 are opened, which enables the support 22 to be placed parallel to the push bar 1 in the position illustrated in broken lines in FIG. 1. This unlocking movement which frees the support 22 enables, moreover, this movement to be obtained automatically when the folding up takes place. The immobilizing member 25 is then acted upon so as to free the protective casings 12 from the sliding pieces 11. Slight pressure then need only be exerted on the handlebar 2 or directly on the push bar 1 in order to cause complete folding up of the push chair. It will be noted that this force is extremely small, the various chassis elements folding up virtually by themselves.

During this folding-up movement, the push bar 1 is displaced downwards, sliding inside the sleeve 13 and remaining at all times parallel to the front underframe 3. Because of this movement, the connecting rod 19, drawn downwards by its hinge pin 20, exerts a tensile force on the extension 18 via its hinge pin 21, which force is transformed into a torque about the hinge pin 16 of the rear underframe 8. The sleeve 13 of the protective casing 12 also drops down, sliding along the front underframe 3, this downward movement being accompanied by the pivoting of the rear underframe 8 about its axle 9. In view of this general downward movement, the front underframe 3 also pivots downwards about its hinge pin 27 on the lower base 26 and about its axle 5.

The position illustrated in FIG. 2 shows the maximum drawn-in position of the push bar 1 in its movement towards the lower end of the front underframe 3. This position therefore corresponds to the minimum longitudinal size of the lateral chassis units. In this position, the alignment 30 has been shown between the hinge pin 20 of the connecting rod 19 and the push bar 1, the hinge pin 21 of the connecting rod 19 on the extension 18 and the rear axle 9 which forms the lower pivoting axis for the rear underframe 8.

The completely folded-up position of the push chair illustrated in FIG. 3 corresponds to a more reduced maximum overall height. The above alignment 30 is not, however, entirely respected with the result that the push bar 1 has come out again slightly, as can be seen in the figure. The structure of the various linking members, and in particular the length of the connecting rod 19 and the orientation of the extension 18, are, however, preferably chosen according to the invention such that, in the completely folded-up position of the push chair, the three axes 20, 21 and 9 are substantially aligned.

In order to obtain this result, it will be possible to modify the orientation of the extension 18, as illustrated in thin lines in FIG. 1 where an extension 18a angled further backwards than the extension 18 has been shown, which hence causes the rod 19 to have a more substantial length and the push bar 1 consequently to be drawn in more substantially when in the folded-up position of the push chair. On the other hand, an extension 18b is situated substantially in the axis of the rear underframe 8 and therefore corresponds to a connecting rod 19 with a smaller length.

I claim:

1. Folding child's push chair comprising two lateral chassis units, at least one transverse bracing member interconnecting said chassis units and which can be deformed for folding-up and unfolding of the push chair, wherein each lateral chassis unit comprises:
   a handle bar;
   a push bar integral with said handlebar,
   a front underframe,
   a rear underframe having an extension and a hinge pin,
   means for enabling the push bar to slide parallel to the front underframe, said enabling means including a sliding piece connected with an upper end portion of the front underframe,
   first and second sleeves, each being freely traversed by the push bar and the front underframe,
   a support piece connected to each of said first and second sleeves, said support piece extending downwards and having a bearing for said hinge pin of the rear underframe, the extension of said rear underframe having an extension extending beyond said hinge pin and
   a connecting rod articulated between an end portion of the extension of the rear underframe and a position next to a lower end portion of the push bar.

2. Folding child's push chair according to claim 1, wherein the orientation and the length of the extension of the rear underframe are such that, in the folded-up position of the push chair, the point of articulation of the connecting rod on push bar is close to a position aligned with the point of articulation of the connecting rod on said extension of the rear underframe and with the lower pivoting point of the rear underframe.

3. Folding push chair according to claims 1 or 2, wherein the extension is angled backwards so as to lengthen the connecting rod.

4. Folding push chair according to claim 1, wherein the support piece forms part of a protective casing enclosing said sleeve and concealing the connecting rod and the extension of the rear underframe in the unfolded position of the push chair.

5. Folding push chair according to claim 4, which comprises a support and position-adjusting means received by the protractive casing for a carry-cot for receiving the child, which carry-cot is mounted between the two lateral chassis units.

6. Folding push chair according to claim 1, which comprises a rear transverse axle having two rear wheels mounted thereon wherein lower end portions of the rear underframes are articulated about said rear transverse axle also carrying two rear wheels.

7. Folding push chair according to claim 1 which comprises a front transverse axle having two front wheels mounted thereon wherein the lower ends of the front underframes are articulated about the front transverse axle.

8. Folding push chair according to claim 1, which comprises an independent wheel unit wherein a lower end of the front underframe receives said independent wheel unit.

9. Folding push chair according to claim 1 which comprises a lower substantially horizontal base articulated on lower end portions of the rear underframe and on lower end portions of the front underframe.

10. Folding push chair according to claim 9, wherein a transport basket is mounted on the lower base carries a transport basket.

* * * * *